(12) United States Patent
Park

(10) Patent No.: US 11,958,872 B2
(45) Date of Patent: Apr. 16, 2024

(54) ZINC COMPLEX COMPOUND COMPRISING CITRIC ACID AND ARGININE LIGAND

(71) Applicant: Lae Ok Park, Seoul (KR)

(72) Inventor: Lae Ok Park, Seoul (KR)

( * ) Notice: Subject to any disclaimer, the term of this patent is extended or adjusted under 35 U.S.C. 154(b) by 0 days.

(21) Appl. No.: 17/278,102

(22) PCT Filed: Sep. 20, 2019

(86) PCT No.: PCT/KR2019/012192
§ 371 (c)(1),
(2) Date: Mar. 19, 2021

(87) PCT Pub. No.: WO2020/060255
PCT Pub. Date: Mar. 26, 2020

(65) Prior Publication Data
US 2021/0347789 A1    Nov. 11, 2021

(30) Foreign Application Priority Data
Sep. 21, 2018 (KR) .......................... 10-2018-0113704

(51) Int. Cl.
*C07F 3/06* (2006.01)
(52) U.S. Cl.
CPC ...................... *C07F 3/06* (2013.01)
(58) Field of Classification Search
CPC ........................................................ C07F 3/06
See application file for complete search history.

(56) References Cited

U.S. PATENT DOCUMENTS

| 10,441,517 | B2 | 10/2019 | Prencipe et al. | |
| 2005/0255173 | A1* | 11/2005 | Bae | A61K 31/194 |
| | | | | 424/643 |
| 2007/0166401 | A1* | 7/2007 | Park | A61K 31/194 |
| | | | | 424/641 |
| 2008/0241272 | A1* | 10/2008 | Bae | A61K 31/19 |
| | | | | 424/642 |
| 2009/0226538 | A1* | 9/2009 | Park | A61P 31/12 |
| | | | | 424/641 |
| 2011/0129547 | A1* | 6/2011 | Pavlovic | A61P 17/00 |
| | | | | 424/642 |
| 2018/0168977 | A1* | 6/2018 | Rege | A61K 8/24 |

FOREIGN PATENT DOCUMENTS

| CN | 109280005 A | * | 1/2019 | ........... A23K 20/121 |
| EP | 1274419 B1 | * | 3/2006 | ........... A23K 20/142 |
| JP | 2003-319760 A | | 11/2003 | |
| JP | 2003319760 A | * | 11/2003 | |
| KR | 10-2006-0094153 A | | 8/2006 | |
| KR | 10-2014-0044093 A | | 4/2014 | |
| KR | 10-2014-0044545 A | | 4/2014 | |
| KR | 10-2016-0098260 A | | 8/2016 | |
| WO | WO-03066573 A1 | * | 8/2003 | ........... A23L 33/165 |
| WO | WO-2004039379 A1 | * | 5/2004 | ........... A61K 31/194 |

OTHER PUBLICATIONS

CAS Abstract and Indexed Compound, L Park et al., US 2021/0347789 (2021) (Year: 2021).*
Y. Deng et al., 62 Journal of Coordination Chemistry, 1484-1491 (2009) (Year: 2009).*
A. Alagha et al. 377 Inorganica Chimica Acta, 185-187 (2011) (Year: 2011).*
S. Sylvie et al., MendelNet, 595-599 (2015) (Year: 2015).*
N.G. Anderson, Practical Process & Research Development, "Chapter 8, Optimizing the Reaction by Minimizing Impurities", 165-184 (2000) (Year: 2000).*
KR Office Action dated Nov. 27, 2019 as received in Application No. 10-2018-0113704.
KR Decision to Grant dated Jun. 5, 2020 as received in Application No. 10-2018-0113704.

* cited by examiner

*Primary Examiner* — Alexander R Pagano
(74) *Attorney, Agent, or Firm* — Maschoff Brennan

(57) ABSTRACT

The present invention relates to a novel zinc complex compound having zinc as a center metal and comprising citric acid and arginine as a ligand.

3 Claims, 1 Drawing Sheet

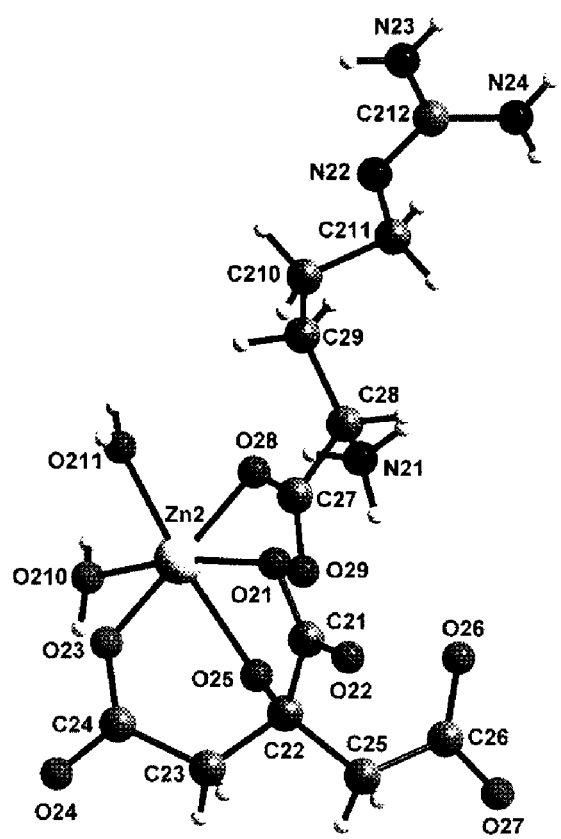

ZINC COMPLEX COMPOUND COMPRISING CITRIC ACID AND ARGININE LIGAND

TECHNICAL FIELD

The present invention relates to a novel zinc complex compound having zinc as a center metal and containing citric acid and arginine as a ligand.

BACKGROUND ART

Zinc (Zn) has been recognized as a microelement essential for life since the early 1900s, and zinc deficiency was first recognized in the early 1960s. Zinc is a microelement essential for various functions in the body, such as cell growth, maturation of reproductive function, immunity, etc., and is contained about 1.5 to 2.5 g in our body, of which about 60% is distributed in the muscles and the rest. distributed in the skeleton, etc.

Zinc affects the action of insulin, which regulates the influx of glucose into fat cells. Zinc is also associated with the activity of hormones such as growth hormone, sex hormone, thyroid hormone, prolactin, etc. Zinc is a component of enzymes and is involved in the synthesis and decomposition of carbohydrates, proteins, lipids, and nucleic acids. In particular, Zinc is involved in the synthesis of nucleic acid DNA and RNA, and plays an essential role in the process of cell differentiation, proliferation and gene expression, thereby facilitating growth, tissue and skeleton formation, reproduction, immune functions, etc. Zinc stabilizes the structure of cell membrane proteins, certain hormones, and gene transcription factors. Cell membrane stability affects receptors and these receptors signalize all kinds of reactions in the cell, and thus cell membrane functions are very important.

Zinc plays an important role in the stabilization of antioxidant enzymes [copper (Cu), zinc-superoxide dismutase (Zn—SOD)] and is also associated with sugar metabolism and insulin action. For patients with type 2 diabetes, it has been reported that zinc supplementation worsens glucose tolerance and does not affect LDL-cholesterol oxidation. For type 1 diabetes, however, it has been also reported that zinc supplementation ameliorates zinc deficiency and thus reduces LDL-cholesterol oxidation.

Zinc has a low absorption rate in grain-dominant diets, but a high absorption rate in meat-based diets. With regard to the estimated utilization rate of zinc, the World Health Organization (WHO) has classified meals into three types: a high zinc meal having a zinc utilization rate of 50-55%, a normal zinc meal having a zinc utilization rate of 30-35% diet, and a low zinc meal having a low utilization rate of 15%. The general diet in South Korea is regarded as the meal with a normal utilization rate (30%). The meal with a high zinc utilization rate refers to a refined meal with a large intake of meat and a small intake of polished grains, and the meal with a moderate zinc utilization rate refers to a mixed meal which includes meat and fish and does not entirely depend on unpolished grains. The meal with a low zinc utilization rate refers to a diet mainly based on vegetable foods, which heavily relies on unpolished and non-fermented grain foods.

Zinc induces the synthesis of metallothionein, a protein which binds to zinc in the same way that ferritin binds to iron when absorbed in the small intestine. In addition, oxalate, phytate, etc., forms an insoluble compound with zinc and thus inhibits the absorption of zinc. Meanwhile, amino acids such as histidine, cystine, tryptophan, etc., form a soluble complex with zinc, thereby enhancing the absorption of zinc.

Zinc is excreted in feces through the pancreas and the intestinal tract. Zinc is also excreted in small amounts through urine and sweat.

Citric acid is also called citric acid as one of the polybasic carboxylic acids having a hydroxy group (—OH), and is contained as a free acid in the seeds and juices of many plants. Citric acid is derived from citron, which is translated into "kuensan" in Chinese, since citric acid contained much in citrus fruits such as lemons, unripe citrus fruits, or the like. Citric of citric acid, which is an English name, is also derived from the Greek word citrus, which means citrus fruits. When citric acid is crystallized in water, a large columnar crystal having one molecule of water of crystallization is formed and well soluble in water and ethanol. When microorganisms are cultured with sugars as a substrate, citric acid is accumulated in the culture fluid, and this phenomenon is called citric acid fermentation. Several culture methods have been studied so far, and 90% of the total amount, of citric acid produced in the world is now made by this fermentation method.

Citric acid plays an important role in the metabolism of higher animals. Citric acid is also known to promote calcium absorption in the body. Citric acid is added to fruit juices and soft drinks, or is also used as an analytical reagent in addition to giving a sour taste to acidity to drug medicines and diuretic beverages. In addition, calcium ions are required for blood coagulation, and thus citric acid is used as a blood coagulation inhibitor because citric acid captures the calcium ions.

Arginine is a kind of basic amino acid, which has guanidine, and is present in the L-form in nature. Arginine is widely distributed as a protein component, and is particularly contained high in protamine in the milt (testis) of fish. Arginine is also found in plant seeds and meat extracts as a free type. Arginine is soluble in water, insoluble in alcohol or ether, and exhibits strong basicity due to the presence of a guanidine group. Arginine is decomposed into ornithine and urea under the action of arginase as a member of the urea cycle along with ornithine and citrulline. Thus, arginine helps to excrete ammonia in the blood as urea, and is effective for hyperammonemia and impaired liver functions.

Arginine is produced by extraction or direct fermentation from sugar. Although its use as a food is limited, arginine is used as a medicine for the purpose of relieving fatigue in Europe.

Meanwhile, the present inventors have developed an anticancer agent and an antiviral agent using a composition containing zinc, citric acid and arginine.

However, a composition for the anticancer agent or the antiviral agent has a disadvantage in that the content ratio of each component in the composition needs to be appropriately adjusted, while the composition ratio may change over time.

DISCLOSURE

Technical Problem

Accordingly, an object of the present invention is to prepare a novel compound containing zinc, citric acid, and arginine, not a composition containing zinc, citric acid and arginine.

Technical Solution

To solve the above problem, the present invention may provide a complex compound of following formula (1) or a hydrate thereof.

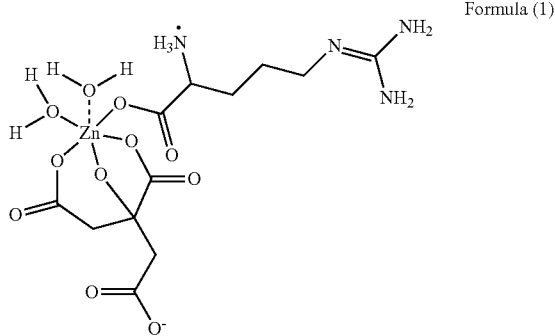

Formula (1)

In addition, the present invention may provide a method for preparing a complex compound of above formula (1) or a hydrate thereof, the method including mixing a zinc compound, citric acid and arginine.

Advantageous Effects

The present invention has an effect of providing a novel compound having zinc as a center metal and containing citric acid and arginine as a ligand.

The compound can be used as an anticancer agent or an antiviral agent.

The present invention has an effect of preparing a complex compound of formula (1) or a hydrate thereof in a large amount through a one-step reaction of reacting a zinc compound, citric acid and arginine.

DESCRIPTION OF DRAWINGS

FIG. 1 is an example showing a three-dimensional structure of a complex compound of formula (1) of the present invention.

BEST MODE

The present invention may provide a complex compound of following formula (1) or a hydrate thereof.

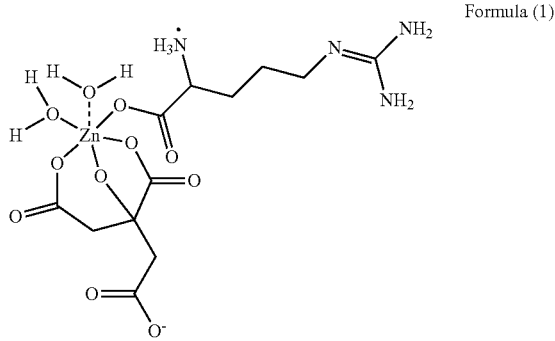

Formula (1)

In the complex compound of above formula (1), citric acid and arginine may be coordinately bonded to a center metal of zinc as a ligand.

FIG. 1 is an example showing a three-dimensional structure of a complex compound of formula (1) of the present invention.

In the complex compound of formula (1) of the present invention, zinc may have a divalent oxidation number and may be hexa-coordinated.

Citric acid may be a tribasic carboxylic acid having a hydroxy group (—OH), and the degree of ionization of the tribasic carboxylic acid may be different from each other, and thus citric acid may form various complex compounds with a center metal. The citric acid may contribute to increasing the solubility of metal ions, thereby increasing bioabsorbable property.

In the complex compound of formula (1) of the present invention, citric acid may be coordinately bonded to zinc, which a center metal, through a hydroxy group and two hydroxy groups of carboxylic acid.

Arginine may be an amino acid having a guanidine group. In the complex compound of formula (1) of the present invention, arginine may be coordinately bonded to zinc, which is a center metal, through a hydroxy group of an amino acid group.

Thus, in the complex compound of formula (1) of the present invention, the guanidine group of arginine and one carboxylic acid of citric acid may be present in the form of an active group.

Meanwhile, in the complex compound of formula (1), two water molecules may be further coordinately bonded to zinc.

The complex compound of formula (1) may be further present in the form of a hydrate by one or more water molecules.

The complex compound of formula (1) may be used as an anticancer agent or an antiviral agent.

The complex compound of above formula (1) may be prepared through a reaction of a zinc compound, citric acid, and arginine.

Preparation of the complex compound of above formula (1) may be performed in an aqueous solution, and a pH may be adjusted with an alkaline solution. Examples of the alkaline solution may include, but are not limited to, an aqueous sodium hydroxide solution, an aqueous potassium hydroxide solution, an aqueous lithium hydroxide solution, an aqueous potassium hydroxide solution, etc. In the present invention, the pH of the reaction solution may be preferably adjusted to 6-8 by using the alkaline solution.

The above preparation may be performed at room temperature and may also proceed by heating to 30 to 90° C., if necessary, and the reaction time may be 2 to 48 hours.

The zinc compound may preferably include a divalent zinc compound, such as zinc oxide (ZnO), zinc chloride (ZnCl2), etc.

After the reaction, the complex compound of formula (1) may be obtained through a step of removing the solvent. Alternatively, the above complex compound may be obtained in the form of a deposit which is precipitated by concentrating the reaction solvent and adding a non-solvent such as tetrahydrofuran.

With zinc oxide as one example, a reaction formula for preparing the complex compound of formula (1) may be as shown in following reaction formula 1.

Reaction Formula 1

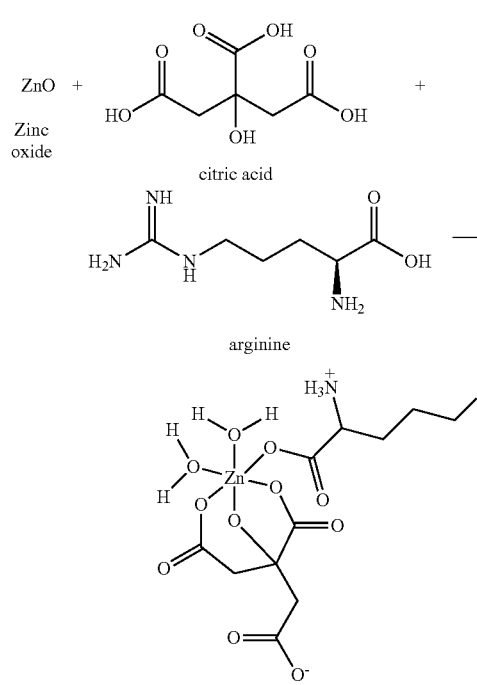

MORE FOR INVENTION

Hereinafter, the preparation of the complex compound of formula (1) will be described through exemplary embodiments. However, the present invention is not limited to the following exemplary embodiments.

EXAMPLE 1

Preparation of Complex Compound of Formula (1)

2 L of water was added to 8.1 g (0.1 mole) of zinc oxide, 19.2 g (0.1 mole) of citric acid and 17.4 g (0.1 mole) of arginine, and the pH was adjusted to 7 with a KOH aqueous solution. The resulting solution was reacted at 60° C., and then the reaction solution was concentrated, after which tetrahydrofuran was added to the concentrated solution, and left alone at room temperature.

The resulting crystals were recovered and analyzed.

The crystal structure was analyzed with a Bruker SMART APX diffractometer.

In the crystal structure, the compound of two molecules was present in the form of a dimer.

FIG. 2 shows an example of the crystal structure.
Empirical formula C24 H48 N8 O24 Zn2
Formula weight 965.46
Temperature 296(2) K
Wavelength 0.71073 Å
Crystal system Monoclinic
Space group P2$_1$
Unit cell dimensions a=7.9323(2) Å α90°
b=16.9820(4) Å β=105.7994(13)°
c=14.1463(4) Å η=90°
Volume 1833.60(8) Å$^3$

INDUSTRIAL APPLICABILITY

The compound of formula (1) can be used as an anticancer agent or an antiviral agent.

The invention claimed is:

1. An isolated complex compound of following formula (1) or a hydrate thereof:

Formula (1)

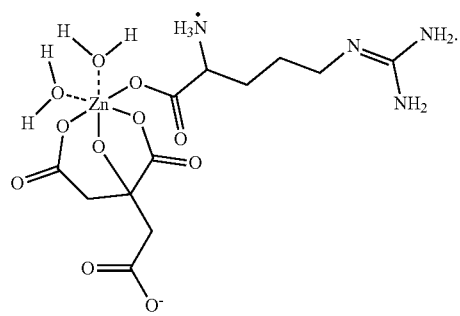

2. A method for preparing an isolated complex compound of following formula (1), the method comprising mixing zinc oxide, citric acid, and arginine:
wherein a reaction solution is prepared by mixing zinc oxide, citric acid, and arginine in an aqueous solution and the pH of the reaction solution is adjusted to 6-8 with at least one alkaline solution, and
wherein the reaction solution is heated at 30 to 90° C.

Formula (1)

3. The method of claim 2, wherein the pH of the solution is adjusted with at least one alkaline solution selected from the group consisting of an aqueous sodium hydroxide solution, an aqueous potassium hydroxide solution, an aqueous lithium hydroxide solution, and an aqueous potassium hydroxide solution.

* * * * *